(12) United States Patent
Chang et al.

(10) Patent No.: US 11,724,233 B2
(45) Date of Patent: Aug. 15, 2023

(54) HIGH-FLUX EFFICIENCY FILTER FABRICATION USING A FLIP BOND PROCESS WITH SUPPORTIVE STRUCTURE

(71) Applicant: Seagate Technology LLC, Fremont, CA (US)

(72) Inventors: Thomas Young Chang, Menlo Park, CA (US); Kim Yang Lee, Fremont, CA (US); Tan G. Liu, Dublin, CA (US); Yautzong Hsu, Fremont, CA (US); Shuaigang Xiao, San Ramon, CA (US)

(73) Assignee: Seagate Technology LLC, Fremont, CA (US)

( * ) Notice: Subject to any disclaimer, the term of this patent is extended or adjusted under 35 U.S.C. 154(b) by 506 days.

(21) Appl. No.: 16/924,839

(22) Filed: Jul. 9, 2020

(65) Prior Publication Data

US 2021/0245109 A1     Aug. 12, 2021

Related U.S. Application Data

(60) Provisional application No. 62/971,329, filed on Feb. 7, 2020, provisional application No. 62/971,333, filed on Feb. 7, 2020.

(51) Int. Cl.
| | | |
|---|---|---|
| *B01D 61/02* | (2006.01) |
| *B01D 67/00* | (2006.01) |
| *B01D 61/14* | (2006.01) |
| *B01D 69/02* | (2006.01) |
| *B01D 71/02* | (2006.01) |
| *B01D 69/06* | (2006.01) |
| *B01D 69/10* | (2006.01) |
| *B01D 46/10* | (2006.01) |
| *B01D 69/12* | (2006.01) |

(52) U.S. Cl.
CPC ....... *B01D 67/0062* (2013.01); *B01D 61/145* (2013.01); *B01D 69/02* (2013.01); *B01D 69/06* (2013.01); *B01D 71/02* (2013.01)

(58) Field of Classification Search
CPC ...... B01D 61/02; B01D 69/02; B01D 61/145; B01D 71/02; B01D 69/06; B01D 69/10; B01D 67/0062; B01D 46/0001; B01D 46/10; B01D 69/12; B01D 2325/021
See application file for complete search history.

(56) References Cited

U.S. PATENT DOCUMENTS

| | | |
|---|---|---|
| 7,048,856 B2 | 5/2006 | Fissell, IV et al. |
| 8,147,562 B2 | 4/2012 | Vacanti et al. |

(Continued)

*Primary Examiner* — Vishal V Vasisth
(74) *Attorney, Agent, or Firm* — Mueting Raasch Group

(57) ABSTRACT

A first wafer has a first stop layer deposited on a substrate, the substrate used to form a base support structure. A second wafer has a second stop layer deposited on a sacrificial substrate, and a filter layer deposited on the second stop layer. A rib layer is deposited on one of: the first stop layer of the first layer; or a third stop layer that is deposited over the filter layer. A rib pattern is formed in the rib layer. The first and second wafers are flip bonded such that the rib pattern is joined between the filter layer and the first stop layer. Elongated voids are formed within the filter layer. The base support structure is formed within the substrate of the first wafer such that there is a fluid flow path between the base support structure, the rib layer, and the elongated voids of the filter layer.

20 Claims, 21 Drawing Sheets

(56) References Cited

U.S. PATENT DOCUMENTS

| | | |
|---|---|---|
| 9,033,908 B2 | 5/2015 | Schilthuizen et al. |
| 2009/0131858 A1* | 5/2009 | Fissell ................ B01D 67/0034 |
| | | 210/243 |
| 2017/0225378 A1* | 8/2017 | Platt .......................... B26F 1/02 |

* cited by examiner ns in multiple figures. The figures are not necessarily to scale.
HIGH-FLUX EFFICIENCY FILTER FABRICATION USING A FLIP BOND PROCESS WITH SUPPORTIVE STRUCTURE

CROSS-REFERENCE TO RELATED APPLICATIONS

This application claims the benefit of U.S. Provisional Patent Application Ser. No. 62/971,329 filed on Feb. 7, 2020 and U.S. Provisional Patent Application Ser. No. 62/971,333 filed on Feb. 7, 2020, both of which are incorporated herein by reference in their entireties.

SUMMARY

The present disclosure is related to a high-flux-efficiency filter with non-perpendicular support ribs, and method of fabricating same. In one embodiment, a first wafer is formed with a first stop layer deposited on a substrate. The substrate is used to form a base support structure comprising a first collection of first closed shapes. A second wafer is formed with a second stop layer deposited on a sacrificial substrate, a filter layer being deposited on the second stop layer. A rib layer is deposited on one of: the first stop layer of the first layer; or a third stop layer that is deposited over the filter layer. A rib pattern is formed in the rib layer. The rib pattern includes a second collection of second closed shape. The first and second wafers are flip bonded such that the rib pattern is joined between the filter layer and the first stop layer. Elongated voids are formed within the filter layer and the base support structure is formed within the substrate of the first wafer such that there is a fluid flow path between the base support structure, the rib layer, and the elongated voids of the filter layer.

In another embodiment, a first wafer is formed that includes, in order, a substrate, a first stop layer and a rib layer. The substrate is used to form a base support structure comprising a first collection of first closed shapes. A rib pattern is formed in the rib layer, the rib pattern having a second collection of second closed shapes. A second wafer is formed that has a sacrificial substrate, a second stop layer, and a filter layer. Elongated voids are formed within the filter layer and the elongated voids are filled with a controlled-thickness gap layer material and a planarization filling material. The first and second wafers are flip bonded such that the rib pattern is joined to the filter layer. The base support structure is formed within the substrate, such that there is a fluid flow path between the base support structure, the rib layer, and the elongated voids of the filter layer.

In another embodiment, a first wafer is formed that has a first stop layer deposited on a substrate. The substrate is used to form a base support structure with a first collection of first closed shapes. A second wafer is formed that has, in order on a sacrificial substrate: a second stop layer, a filter layer, a third stop layer, and a rib layer. A rib pattern is formed in the rib layer, the rib pattern having a second collection of second closed shapes. The first and second wafers are flip bonded such that the rib pattern is joined to the first stop layer of the first wafer. Elongated voids are formed within the filter layer. The base support structure is formed within the substrate, such that there is a fluid flow path between the base support structure, the rib layer, and the elongated voids of the filter layer.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

Embodiments described herein include nano-scale filters. Solid state ultra-filters fabricated using semiconductor thin film patterning technology is challenged with making nano-size scale feature packed closely together in a high density pattern to achieve the high pass through flux of liquids per unit area (areal flux efficiency), at a given operating pressure across the filter membrane. The high-density slit/hole filter sheets are built from substrates that should have sufficient thickness to provide mechanical robustness and resist breakage from the pressure difference across the filter membrane A high flux efficiency can be difficult to achieve when thicker films are used to achieve high mechanical robustness, making the high-density filter pattern challenging to fabricate. The result is that there may be a tradeoff in the design between the mechanical robustness requirement and high flux efficiency that is attainable with high density slit/elongated-hole pattern.

Supporting structures may be used to provide mechanical support to nano-scale filter sheets. Embodiments described herein include methods for manufacturing such filter sheets and supports using micro-manufacturing techniques, e.g., layer deposition, photolithography. The support structures may exhibit cause a loss of flux efficiency depending on the design parameters. Accordingly, other embodiments described herein use cross support architecture to overcome filter blockage and flux area constriction issues and further opens up the design parameters to enable higher density pattern results in increase flux efficiency.

Figure 1A:
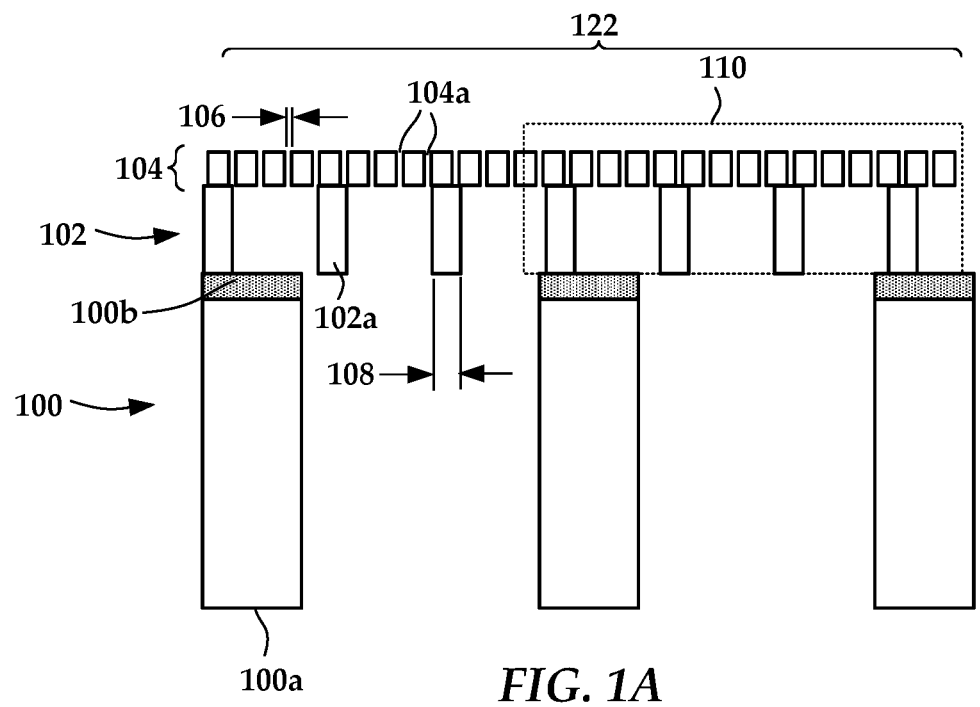
FIGS. 1A-1C are side views of filter structures according to example embodiments.

In FIG. 1A, a section view shows an example of the filter fabricated using a flip bond process that will be described in greater detail hereinbelow. The filter includes base structure 100 with a first matrix of first closed shapes extruded in a perpendicular direction from a bottom edge 100a to a top edge 100b. A rib structure 102 is on the top edge of the base structure, the rib structure comprising a second matrix of second closed shapes extruded in the perpendicular direction. The second closed shapes may each be no more than 0.10 the size by area of the first closed shapes of the base structure 100. A planar filter sheet 104 is mounted on the rib structure 102. The filter sheet 104 has a matrix of elongated holes 104a (also referred to herein as slits). The elongated holes 104a may be no more than 0.10 the size by area of the second closed shapes of the rib structure 102.

Figure 1B:
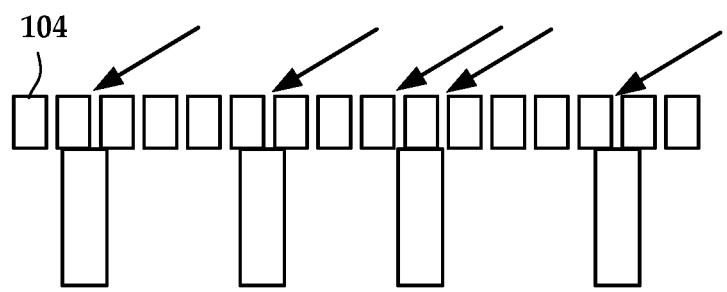
Figure 1C:
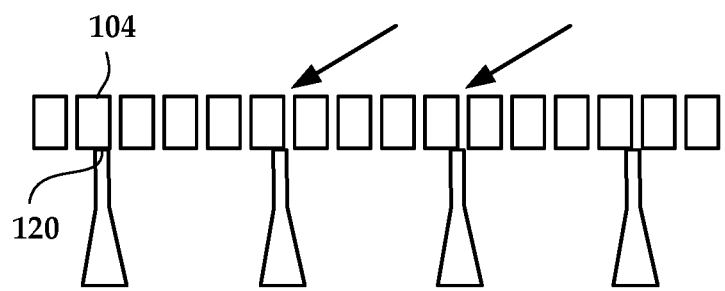

If the rib width exceeds the filter slit width, then there will be regions where the rib supports will block the flux flow as shown in FIGS. 1B and 1C, which show a magnified illustration of the filter and rib section 110 shown in FIG. 1A. The embodiments shown in FIGS. 1B and 1C include different rib profiles. The rib profile in FIG. 1C is tapered such that an edge 120 of the rib structure in contact with the filter sheet is smaller than the rest of the rib structure. There may be a desire in some cases to make the rib width wider as shown in FIG. 1B, since it may relax the rib pattern resolution, increase mechanical strength, and reduce the rib support aspect ratio for easier processing. Since the rib support 102 and filter sheet pattern 104 are randomly bonded, there may be some slits 104a that are blocked by the rib supports 100 reducing the efficiency of the filter.

Figure 2A:
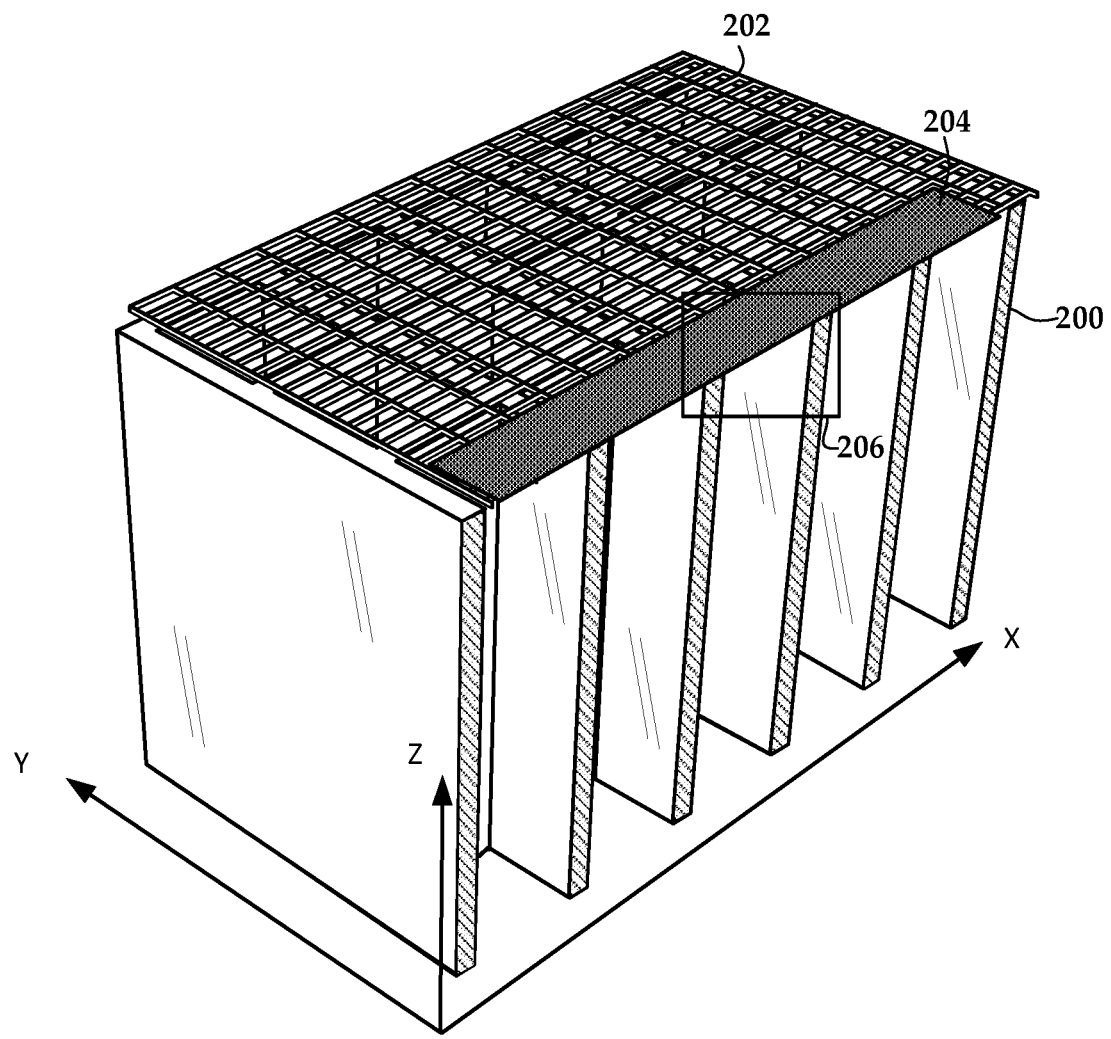
FIGS. 2A-2C are perspective views of a filter according to an example embodiment.
Figure 2B:
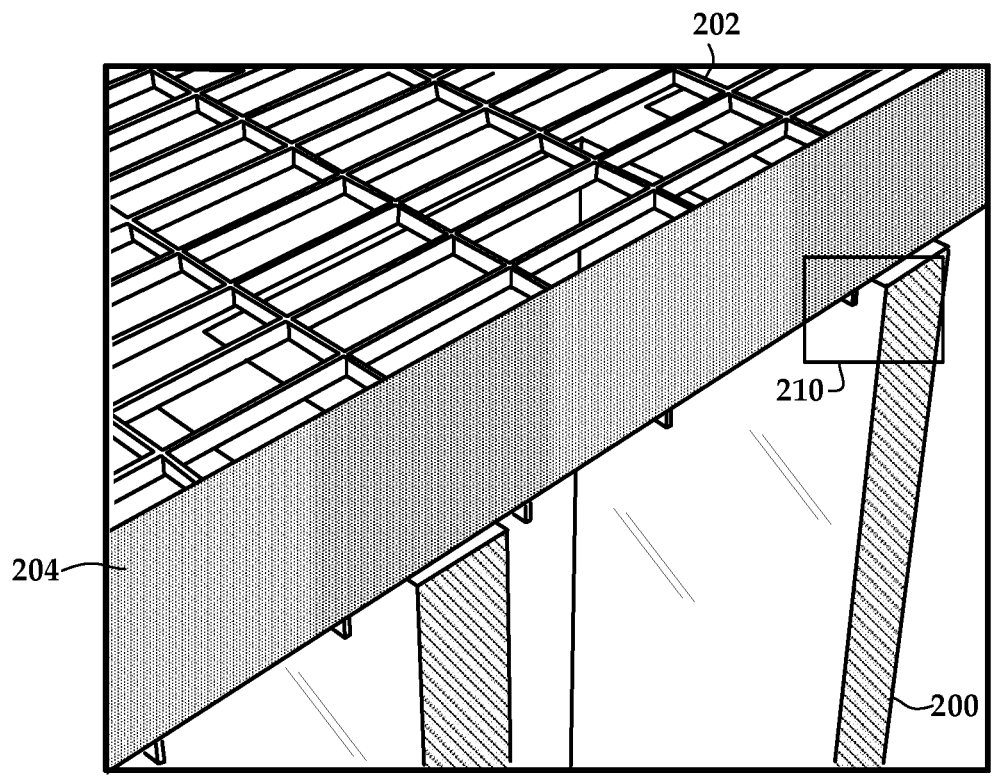
Figure 2C:
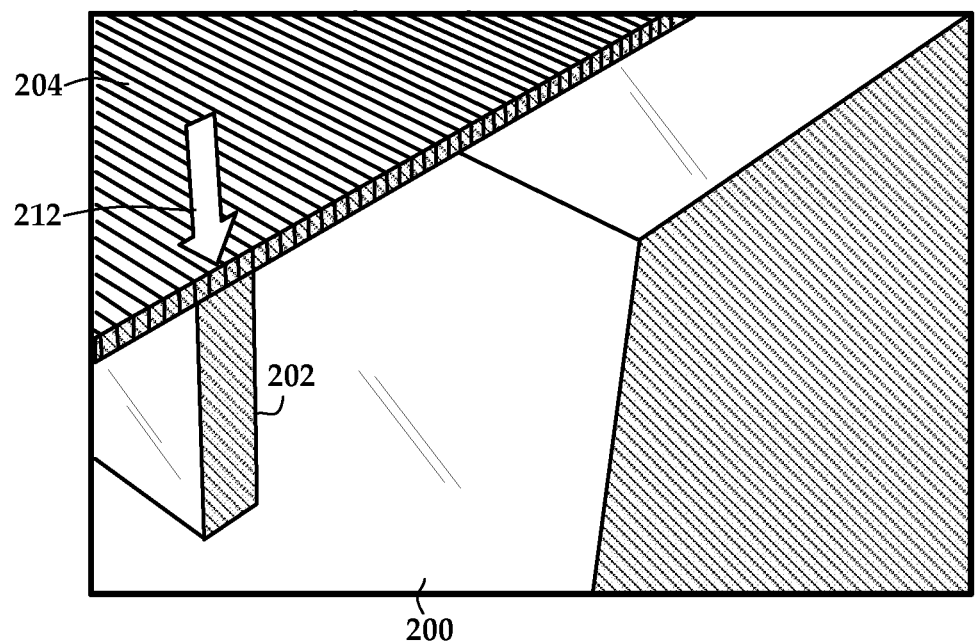

In FIGS. 2A-2B, perspective views show aspects of a filter and support structure according to an example embodiment. As best seen in FIG. 2A, rib structure 202 is formed on a top edge of a base structure 204. A portion of the filter sheet layer 204 is shown to expose the underlying rib 202 and main/base 204 support structure configuration. In practice, the filter layer 204 would entirely (or mostly) cover the rib structure 204. Rectangle 206 indicates the extents of the close up view in FIG. 2B, and rectangle 210 in FIG. 2B indicates the extents of the close up view of FIG. 2C. The arrow 212 in FIG. 2C indicates where a rib support is blocking the flow through the slits in the filter layer 204. The blockage is due to contact between the filter and rib support along the entire length of the slit opening.

Note that the main supports 200 have a much larger width and never touch the filter sheet 204. Thus the main supports 200 will not significantly interfere with the filter flow. Large main supports can be a significant blockage region and may be an issue with existing designs. Embodiments described below include features that can reduce the flow constriction caused by rib support 202 blockage.

The flow blockage of the ribs 202 are due to two factors. One is the width of the mechanical supporting rib structure 202 which should be sufficiently wide to provide mechanical support for the filter at lower pattern density than the filter itself. The second reason for the blockage is that both rib and filter pattern orientation as seen from the top side is that they are parallel to each other in the plane in both x and y direction. In FIG. 2A, the orientation of x and y axes are shown with respect to the filter sheet 204 and rib structure 202.

Figure 3A:
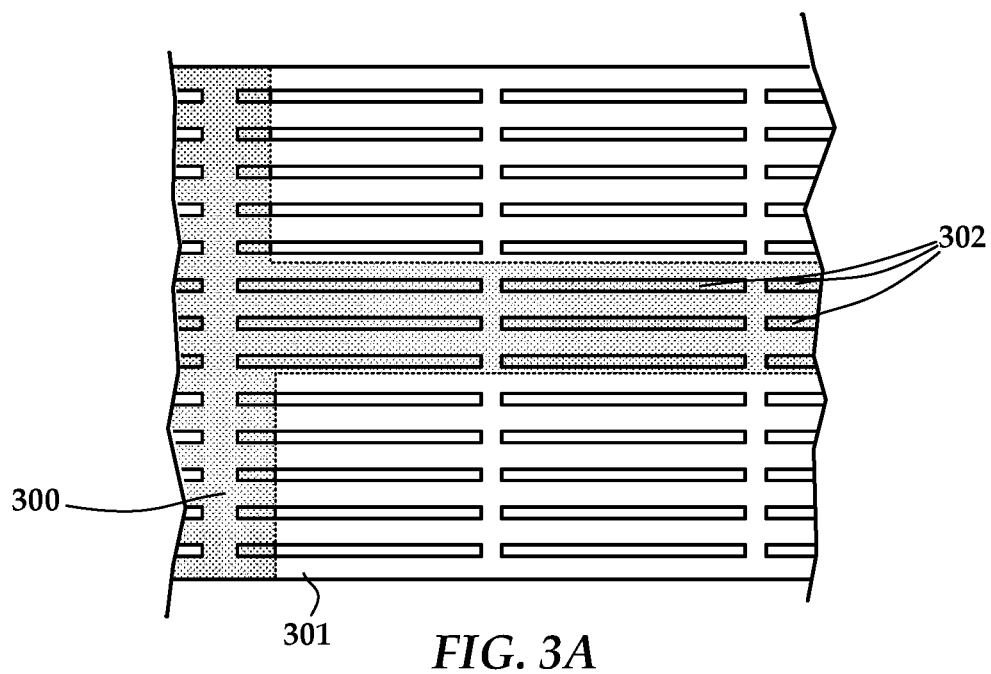
FIGS. 3A-3B and 4A-4H are plan views of rib patterns overlaid on filter layers according to example embodiments.
Figure 3B:
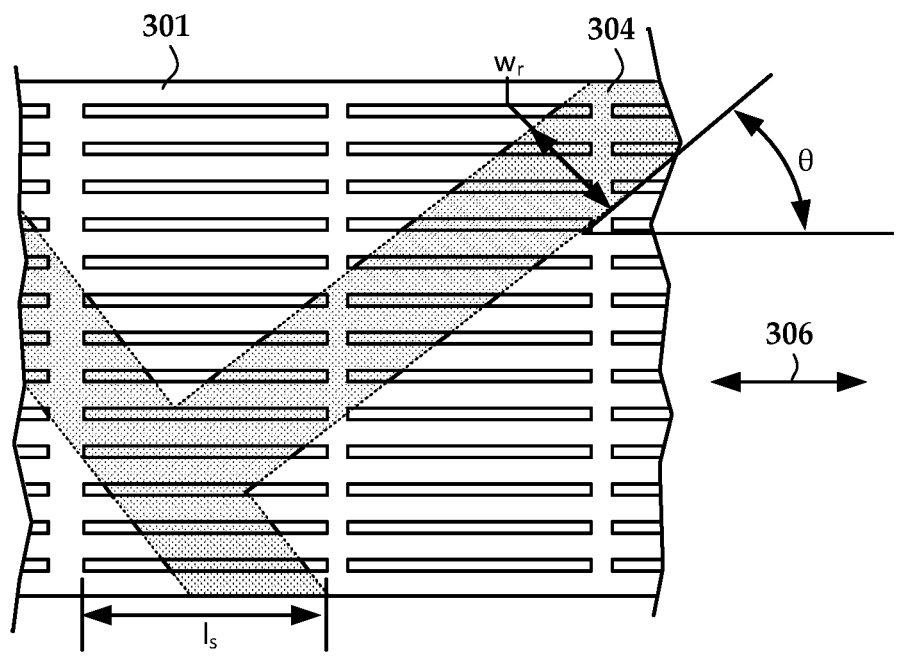

The second cause of the blockage can be reduced by rotating the orientation of the rib structure with respect to the filter layer such that the supporting rib structure only blocks a subsection of the slit in the filter layer ensuring that the liquid will have an open path down pass the rib and the main support. In FIG. 3A, a plan view shows a filter structure according to an example embodiment. The rib support pattern 300 (shaded areas) is shown over a filter layer 301. The indicated slits 302 in the filter layer 301 are fully blocked by the rib support 300. In FIG. 3B, a rotated rib pattern 304 is shown over the same filter layer 301.

In the embodiment shown in FIG. 3B, the filter layer 301 is still supported by the rib structure 304, but due to the rotation of the rib pattern by angle θ with respect to the primary slit orientation 306 (e.g., θ is between 30 and 60 degrees), the slit through holes are never fully blocked over the length of the slit. Therefore, there are well distributed open paths for the liquid to pass through the slit from the top of the filter to the bottom so flux efficiency loss is reduced due to incomplete blockage of the rib and main supports. Note that the width $w_r$ of the ribs may be less than a length is of the slits, ensuring that none of the slits are fully blocked by the rib support so the flow of liquid can still pass through the slit and out the open unblocked areas.

The example shown in FIG. 3B with the non-aligned rib pattern 304 with respect to the slit pattern can be generalized to any non-orthogonal rib support orientation with respect to the filter sheet orientation. Several examples of non-orthogonally oriented rib structure designs with respect to the filter sheet orientation are shown in FIGS. 4A-4H, which are diagrams of rib arrangements according to example embodiments. Generally, the rib structures may include collections of closed shapes connected together to maintain mechanical rigidity. In general, the ribs may not be parallel to (and in some cases not perpendicular to) the direction of slits.

Figure 4A:
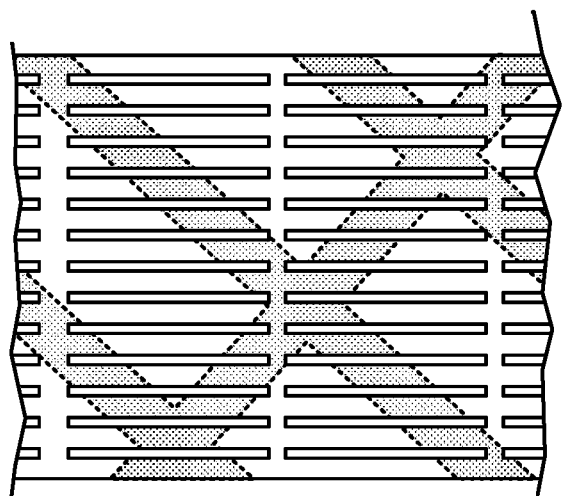
Figure 4B:
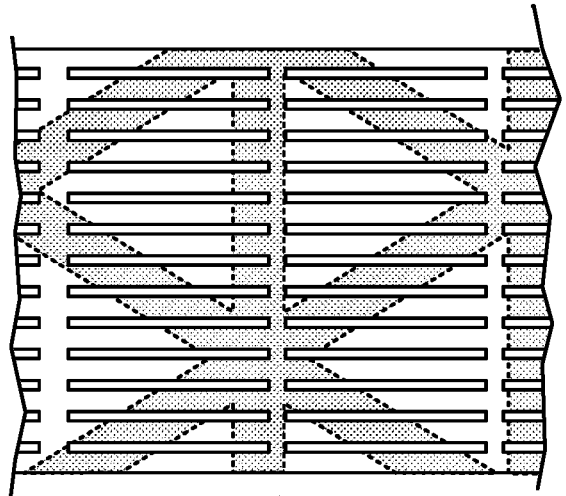
Figure 4C:
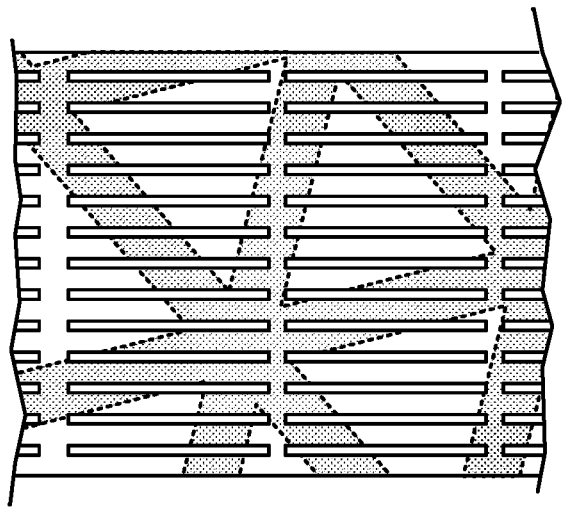

The arrangement in FIG. 4A is a rectangular or square rib pattern at roughly 45 degree angle with respect to the slit through hole orientation as shown by the yellow pattern. This pattern may be a preferred pattern for some applications. The arrangement in FIG. 4B is a triangular rib pattern with one of the sides being orthogonal to (normal/perpendicular to) the primary slit direction. The diagram in FIG. 4C shows a similar triangular pattern as FIG. 4B but rotated such that no side is either parallel or orthogonal to the primary slit direction. In general, any permutations of triangle length, orientation and angle may work, preferably with no side of the closed shapes that form the rib structure being parallel with the primary slit direction.

Figure 4D:
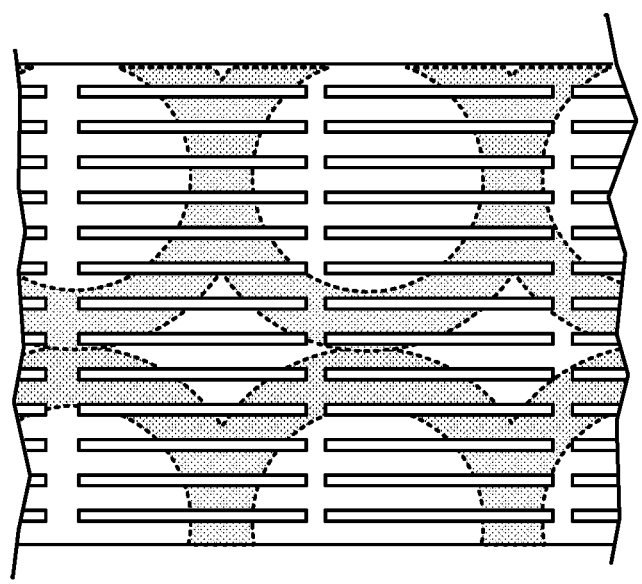
Figure 4E:
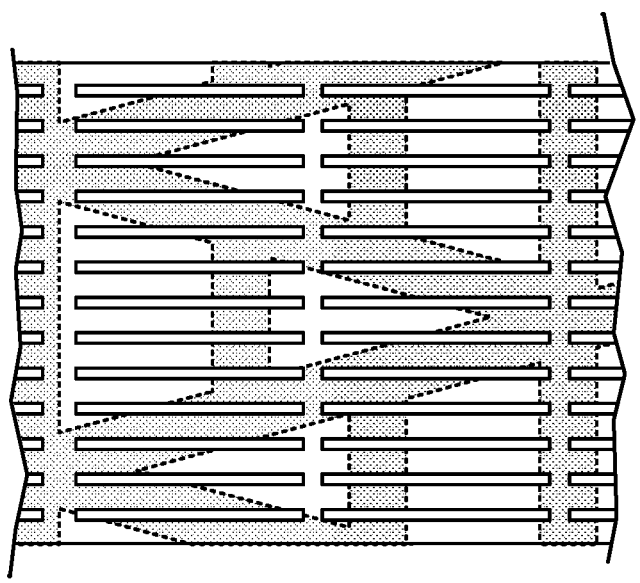
Figure 4F:
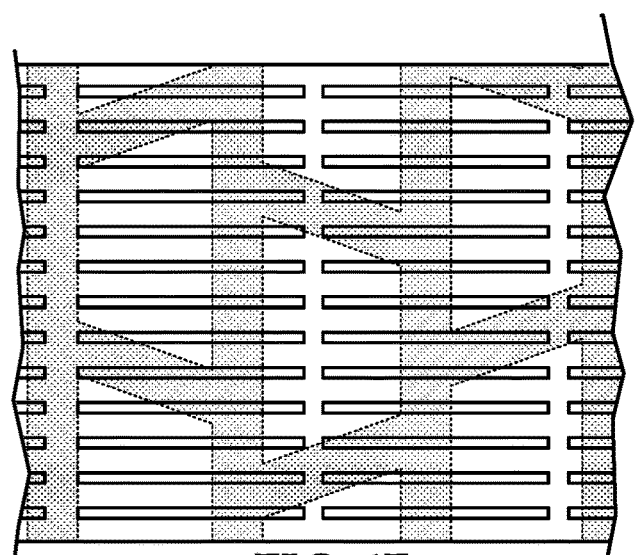
Figure 4G:
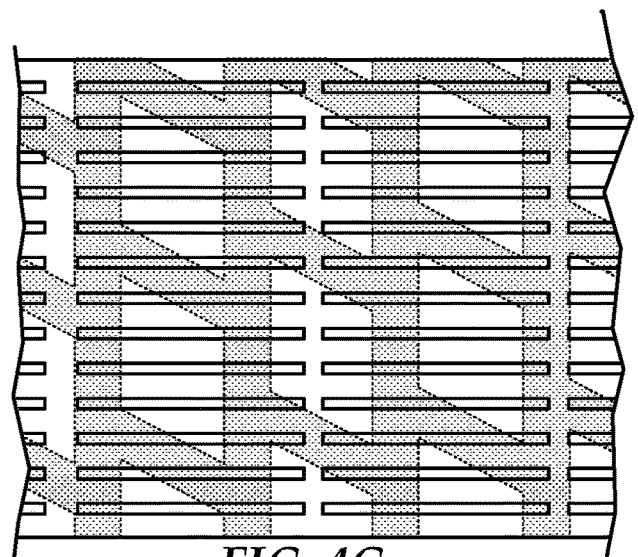
Figure 4H:
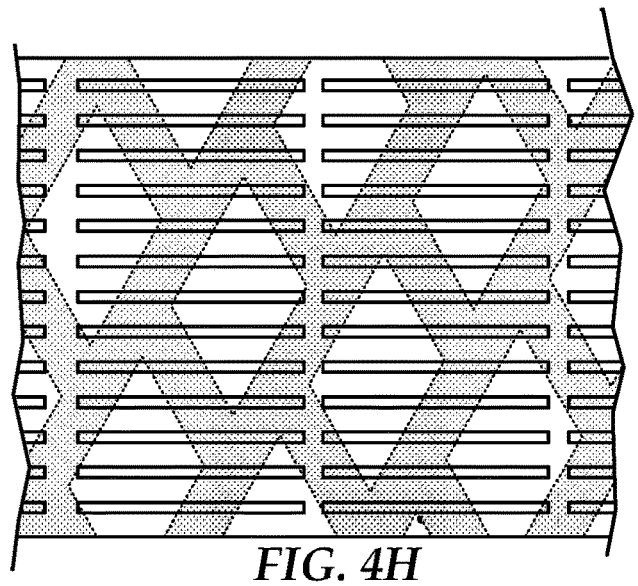

In FIG. 4D-4H, diagrams show other examples of rib pattern which obey these rules that eliminate complete blockage of the slit through holes. The diagram in FIG. 4D shows a connected circular pattern. In FIG. 4E, a trapezoid and triangle pattern can limit the maximum length of unsupported filter beam which provides the mechanical support. The diagram in FIG. 4f shows a trapezoid pattern that minimizes the maximum length of unsupported filter beams which provides the mechanical support. The diagram in FIG. 4G shows a parallelogram pattern. The diagram in FIG. 4H shows a rotated parallelogram pattern or diamond-like pattern. This pattern might be another preferred pattern that provides uniform area rib cells, a regular structure that simplified repeated pattern design, and each rib vertices has three sections that provides uniform joint support across the entire rib support structure.

Figure 5A:
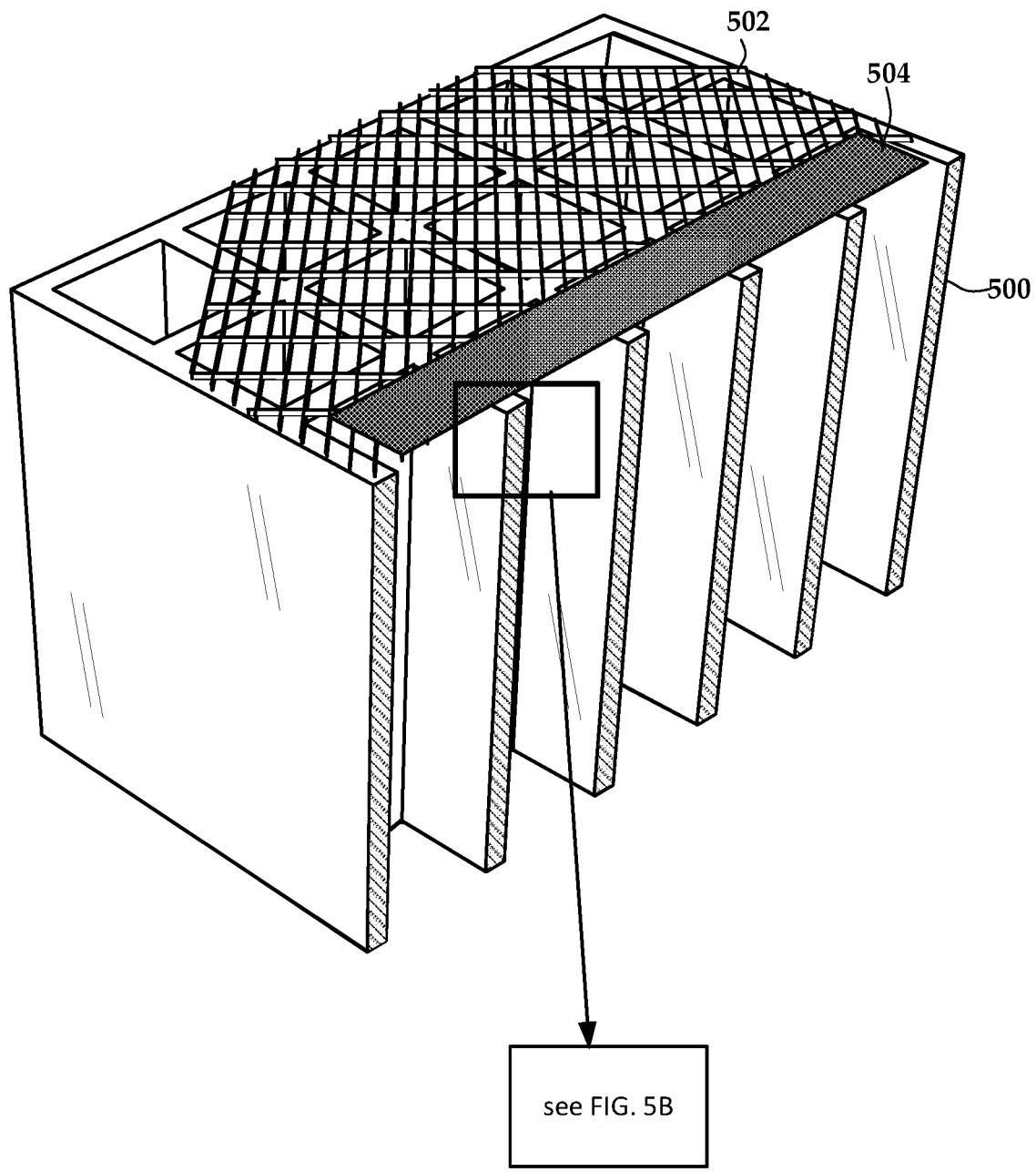
FIGS. 5A-5C are perspective views of a filter according to another example embodiment.
Figure 5B:
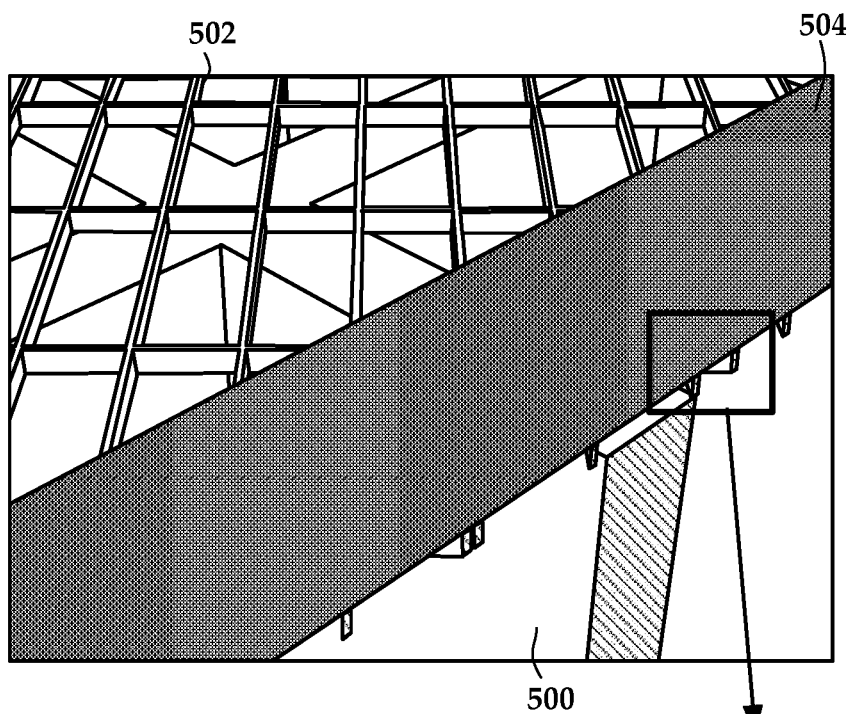
Figure 5C:
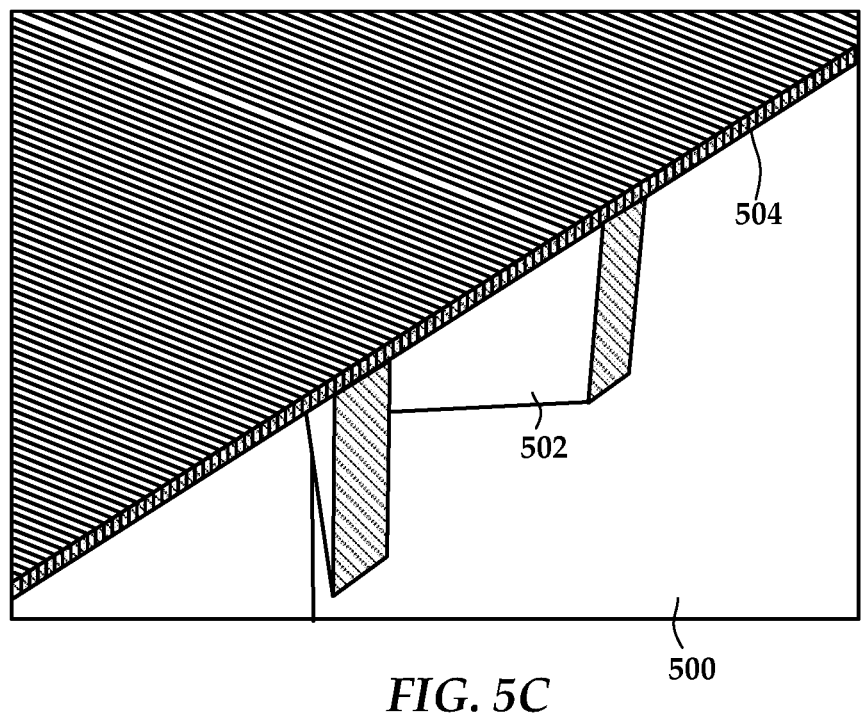

Note that any of the rib matrix patterns can be rotated in the xy plane to achieve an optimized angle that maximizes total flux per unit area of the filter. The perspective views in FIGS. 5A, 5B, and 5C show respective wide to close-up isometric section views illustrating a rotated rectangular rib pattern 502 with respect to the orientation of the upper filter sheet 504 and lower main support structure 500.

Figure 6A:
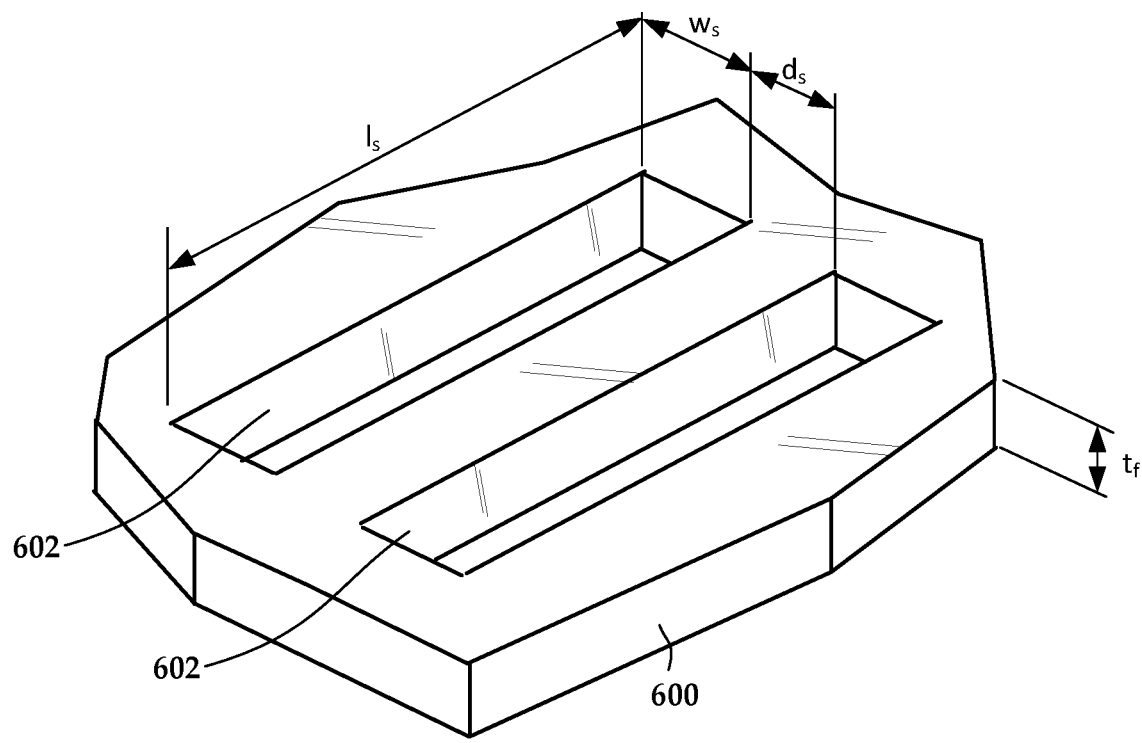
FIGS. 6A-6B are isometric views showing filter dimensions according example embodiments.
Figure 6B:
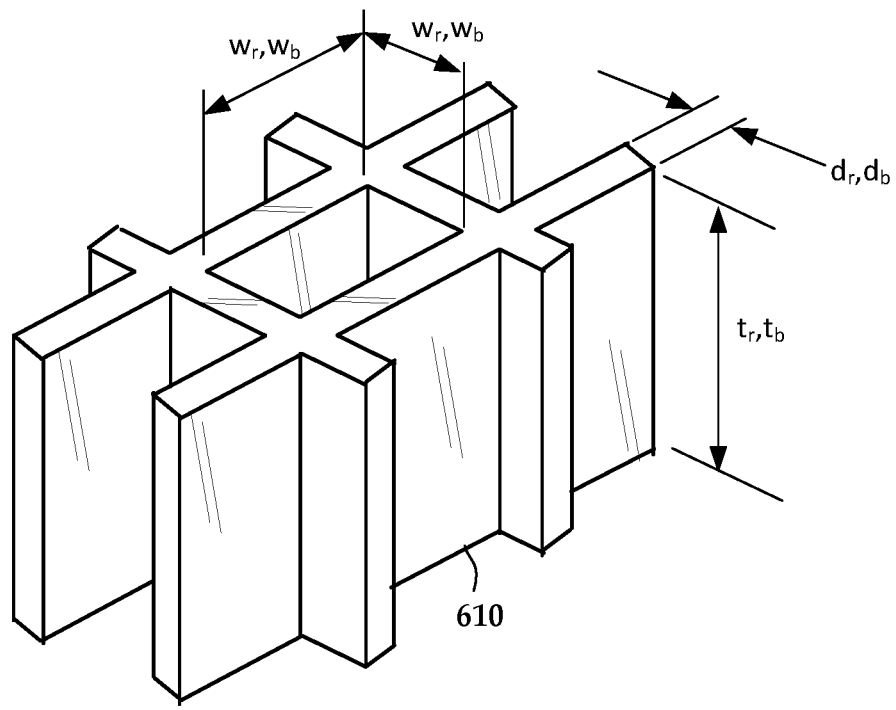

In conclusion, a mechanical support structure for an ultra-filter is made of regular intersecting line patterns rotated in the plane of the film. The support structure is intentionally non-aligned with filter slit orientation which reduces fluid flow blockage. The scale of the filter and support structures can vary depending on the end use. Generally, the filter sheet itself has nano-meter scale passages, which is useful for applications such as water purification and hemo-filtering. In FIGS. 6A-6B, isometric views illustrate approximate and non-limiting dimensions of various filter structures described above.

In FIG. 6A, a portion of a filter sheet 600 is shown, with two elongated holes 602. A thickness $t_f$ of the filter sheet 600 may be on the order of 50 nm to 1000 nm. Width and length of the elongated holes 602 may be on the order of $w_s=1$ nm to 15 nm and $l_s=$ can be as short as 50 nm but the max length does not have an upper limit in the case of a circumferential pattern. Also it is desirable to make this dimension as long as possible to maximize the slit area to increase porosity of the filter sheet. No upper limit needs to exist since the slit width can be maintained by the attachment of the underlying ring support structure. Separation distance between the elongated holes 602 is on the order of $d_s=5$ nm to 100 nm. A separation distance on the low end of this range (e.g., 5-20 nm) may be preferred to improve porosity and thus improve flux efficiency.

In FIG. 6B, a structure 610 is illustrated to represent both the rib structure and the base structure for purposes of showing example dimension ranges. A thickness $t_r$ of the rib structure may be on the order of 0.5 um to 100 um and thickness $t_b$ of the base structure may be on the order of 100 um to 1000 um. Side dimension of the closed shapes that form the rib structure may be on the order of $w_r=5$ um to 100 um and side dimension of the closed shapes that form the base structure are on the order of $w_b=15$ um to 500 um. Rib dimension of the rib structure may be on the order of $d_r=0.1$ um to 5 um. Rib dimension of the base structure may be on the order of $d_b=1$ um to 100 um.

The high density slit/hole filter sheets are built from substrates with sufficient thickness to provide mechanical robustness and resist breakage from the pressure difference across the filter interface. However, thicker substrates mean that small features need to be patterned through an increasing thick substrate requiring high aspect ratio patterning methods at the nanoscale level which is may be challenging and limit further pattern density improvements to increase flux efficiency of the filter. Therefore, rib and base support structures as described above should have sufficiently high density to ensure that the thin filter sheet does not break under operating pressure. Greater density of supports mean the filter sheet can be made thinner to enable higher density filters, however, the support region blocks the flow above the supports, and reduces flux efficiency. In the following section, methods of manufacturing the filters and support structures are described.

Figure 7A:
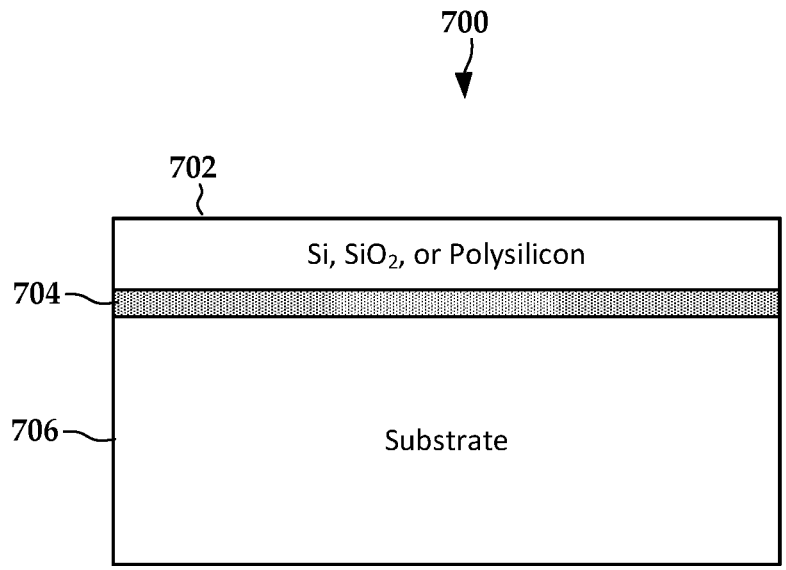
FIGS. 7A-7B are diagrams showing a process of forming a first, base support wafer according to an example embodiment.
Figure 7B:
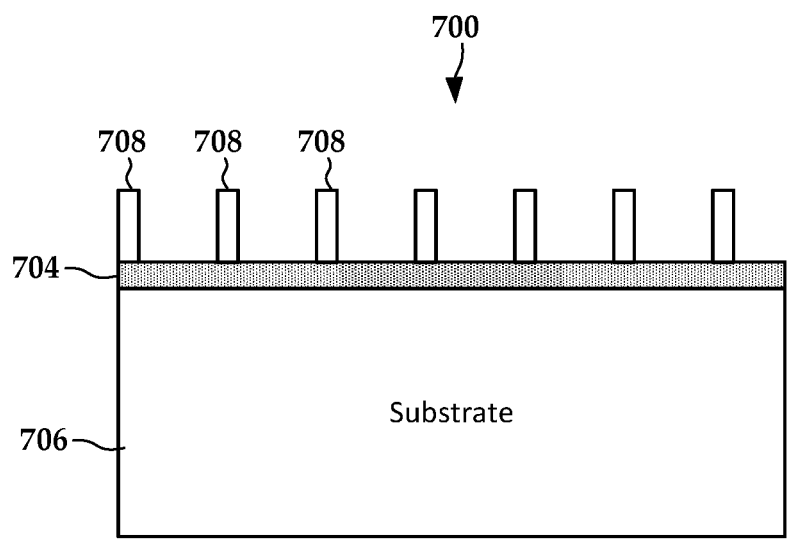

The diagrams in FIGS. 7A-7B, 8A-8G, and 9-10 show a process for forming a filter according to an example embodiment. In FIG. 7A, a cross section illustrates a starting support structure wafer 700. The wafer 700 includes a substrate 706 which is typically Si, but may be made from other materials). An oxide 704 is layer-deposited onto the substrate 706 and acts as an etch stop layer. A top silicon-based layer 702 is formed on top of the stop layer 704 and will be made into the rib structure. In FIG. 7B, a diagram shows the patterned and etched rib structure 708 that is formed using photolithography processes. The detailed steps are not shown since this is an established process for materials such as Si.

Figure 8A:
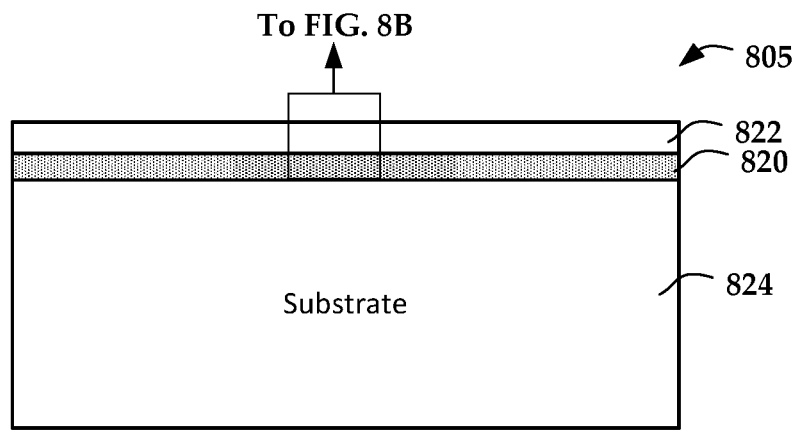
FIGS. 8A-8G are diagrams showing a process of forming a second, filter-forming wafer according to an example embodiment.
Figure 8B:
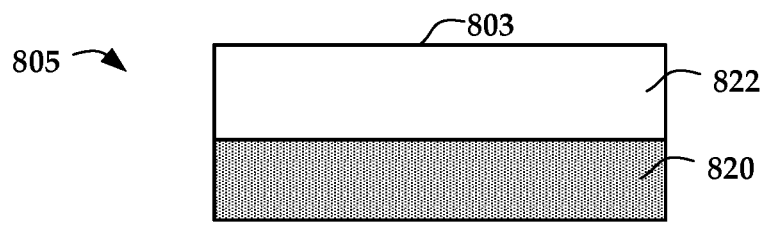
Figure 8C:
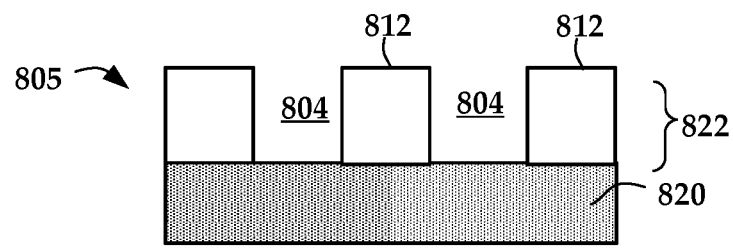
Figure 8D:
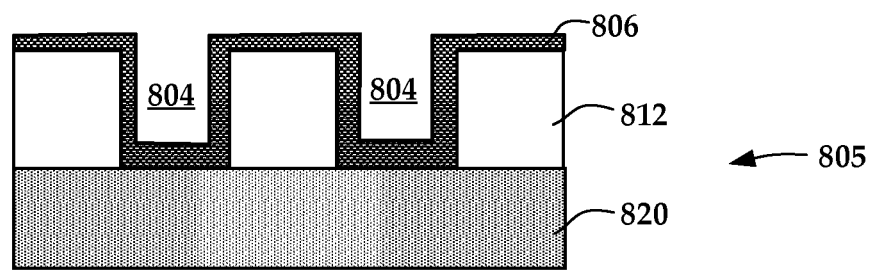
Figure 8E:
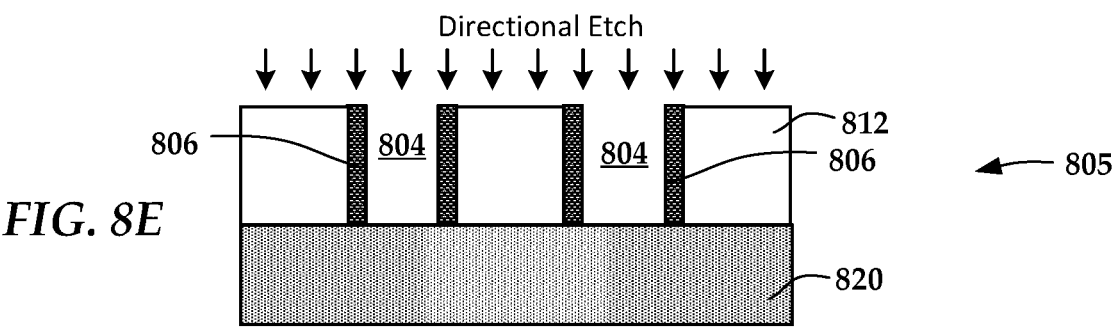
Figure 8F:
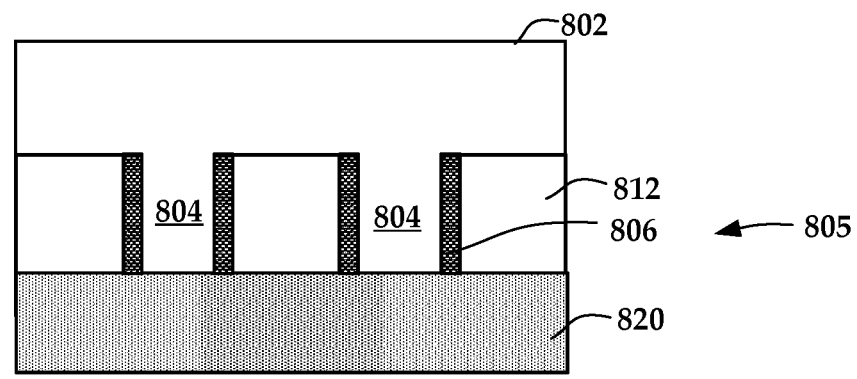
Figure 8G:
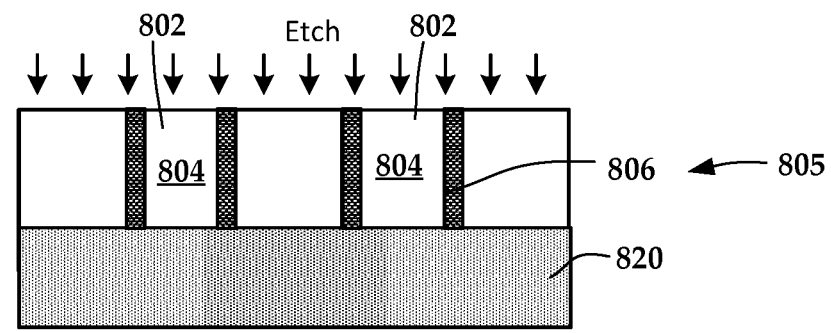
Figure 16:
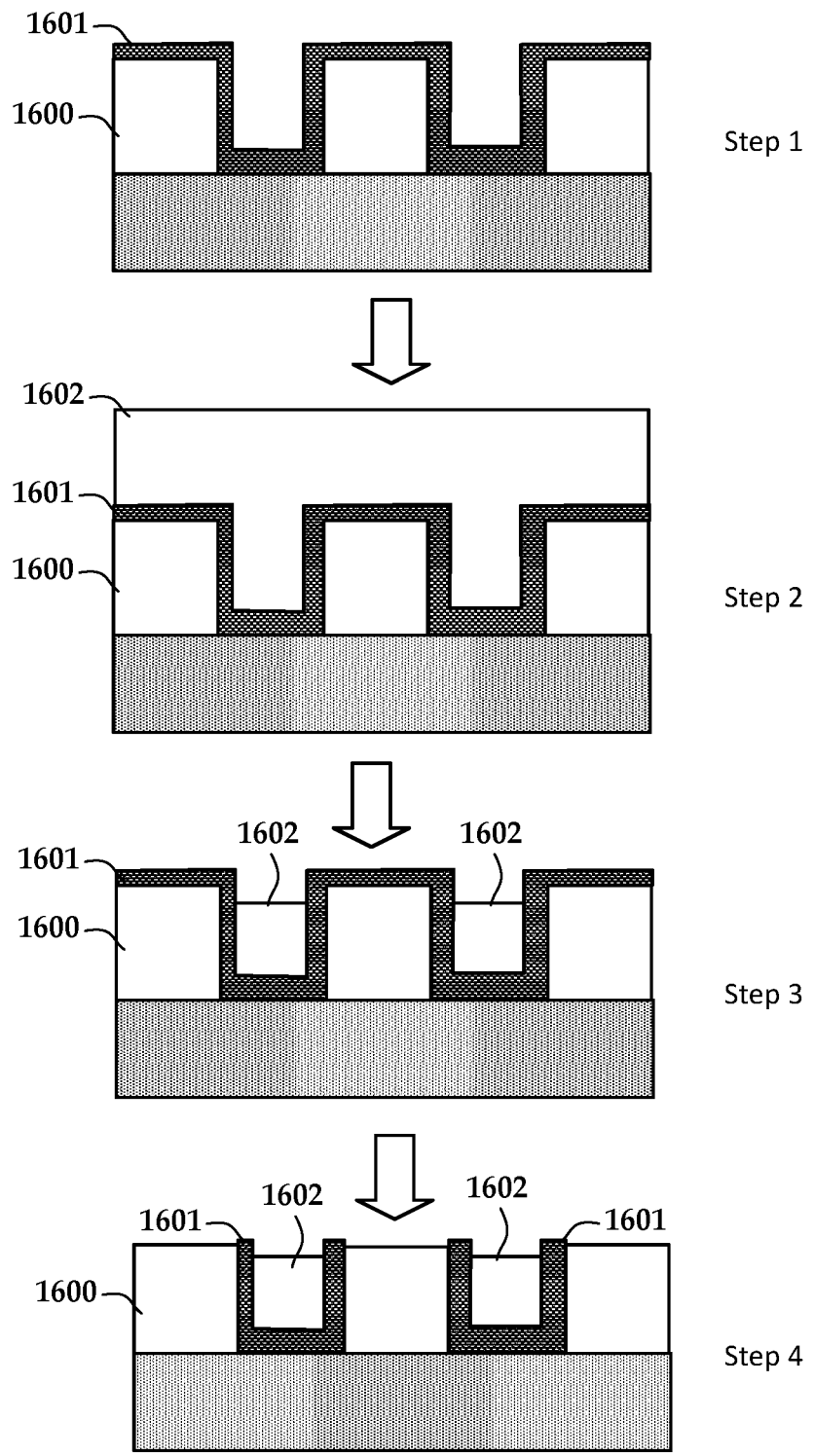
FIG. 16 is a process diagram showing the formation of filter layer features according to an example embodiment.

In FIG. 8A, a cross section view illustrates the starting filter sheet wafer 805 with etch stop 820, filter layer 822, and substrate 824. The diagram in FIG. 8B shows a higher magnification detail of the top filter sheet layer and etch stop layer. The diagram in FIG. 8C shows the pre-gap pattern of the filter layer 822 that is made with an imprint and etch process. Generally, the spaces 804 between material islands 812 form the filter slits. The diagram in FIG. 8D shows a well-controlled-thickness gap layer 806 being deposited using highly conformal deposition, e.g., atomic layer deposition. The diagram in FIG. 8E is a cross section profile after directional etch has been used to remove the gap material on top of the filter sheet and at the oxide interface while leaving the gap material 806 on the vertical walls intact. The diagram in FIG. 8F is a section profile after a planarization filling material 802 (e.g., poly silicon) is deposited for subsequent planarization. In FIG. 8G, a section profile illustrates the filter layer after etch or chemical-mechanical planarization to planarize the surface and expose the gap material 806. Note that in a different sequence of operations may be performed for a similar result, e.g., as shown in FIG. 16 and described in greater detail below.

Figure 9:
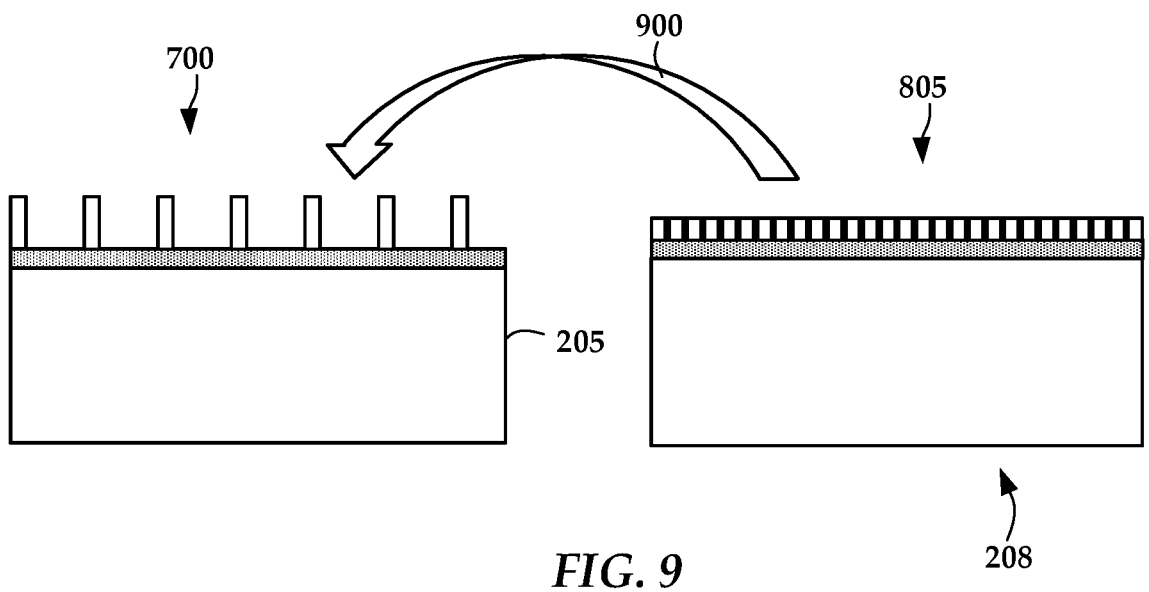
FIGS. 9-10 are diagrams showing flip bonding of first and second wafers according to an example embodiment.
Figure 10:
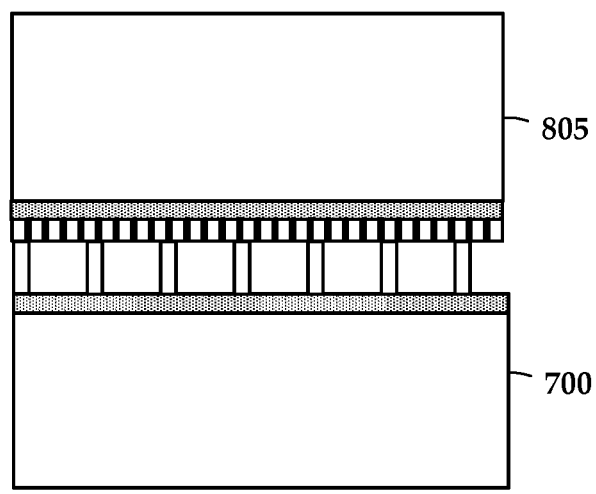

The diagram in FIG. 9 shows the rib and pre-support layer 700 (wafer 1) before flip bonding to the filter sheet layer 805 (wafer 2). The filter sheet layer has the gap material 802 intact before the flip bonding step. The arrow 900 represents the next flip bonding step. The diagram in FIG. 10 shows the assembly after the rib/support layer 700 is bonded to the filter sheet and substrate 805. Since the mating surfaces may both be of silicon-based material, a number of permanent bonding methods are available. One example is thermal hydrophilic Si—Si bonding. Other methods include the use of polymer glue to mate the two interfaces.

Figure 11A:
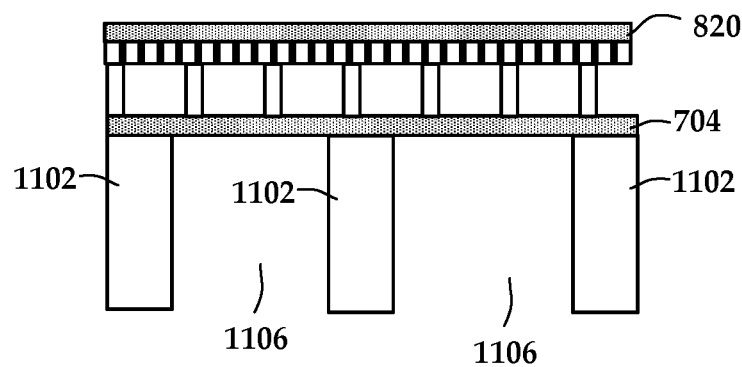
FIGS. 11A-11C are diagrams showing final processing of flip bonded first and second wafers according to an example embodiment.
Figure 11B:
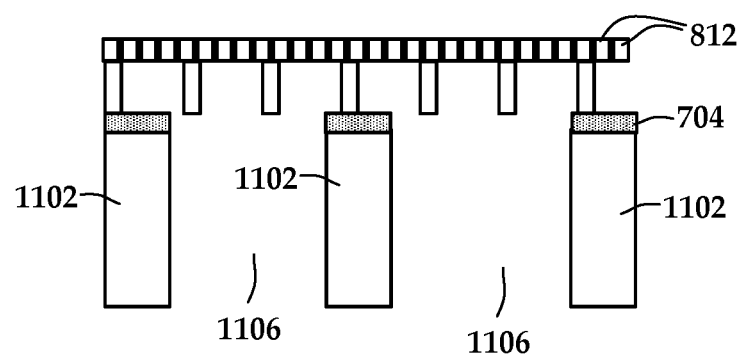
Figure 11C:
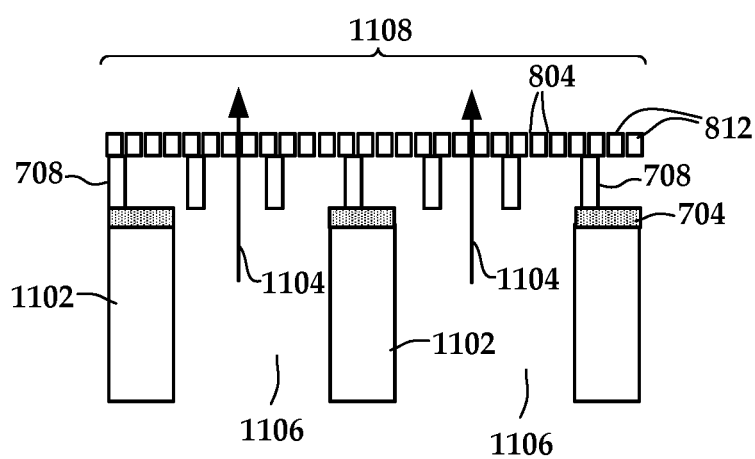

The diagram in FIG. 11A shows, after the bonding, the filter substrate (substrate 824 seen in FIG. 8A) has been removed using, e.g., a reactive etch process that removes the substrate material completely and leaves the oxide etch stop layer 820. The bottom support structure is formed after patterning the support structure 1102 and opening up the vias 1106 with a deep etch process that also stops when the oxide layer 704 is exposed which is also the etch stop layer. In FIG. 11B, the oxide etch stop layer 704 is next removed using another reactive ion etch chemistry that selectively removes the oxide layer 704 and leaves the silicon-based filter layer structures 812 intact. In FIG. 11C, a diagram shows the results of a final selective etch step that removes the gap material (e.g., material 802 and 806 seen in FIG. 8G) in the filter layer thus completing the ultra-filter. This opens the previously formed spaces 804 in the filter layer such that fluid can move through the layer as indicated by arrows 1104.

Figure 12A:
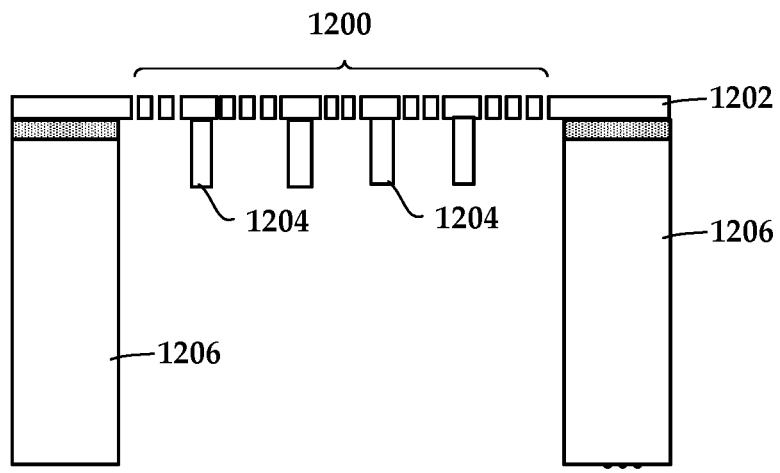
FIG. 12A is a diagram showing a filter structure according to an example.

The embodiments shown herein may solve issues associated with the fabrication challenges of an ultra-filter with nano-size slit openings that achieves high flux efficiency, while maintaining mechanical robustness from breakage under operating pressure. A minimal amount of filtering slit real estate is lost since the areas reserved for the base support is eliminated with the flip attach process. In FIG. 12A, a diagram shows an active area 1200 of a filter layer 1202 for a design where a rib structure 1204 is used, but the filter layer 1202 is attached directly to main supports 1206. Compare this to the active area 1108 shown in FIG. 11C where the rib structure 708 is between the main supports 1102 and the filter layer structure 812.

As noted previously, the ultrafilter fabricated using the conventional process approach has lost filter active regions where the support structure is in contact with the filter sheet. Significant active area is lost which depends on the required rib and support density needed to provide mechanical robustness of the filter sheet. If the filter sheet can be made thick, then less support is needed but comes at the cost of filter sheet process difficulty and inability to increase the slit density for flux areal efficiency improvement. In the embodiment shown in FIG. 11B, a large amount of the area of the filter can be made active since the filter sheet structure 812 is fabricated separately from the support structure 708. Since the dependence is broken between support density and filter sheet areal efficiency, the support density can be increased to improve mechanical rigidity, without compromising flux efficiency or even to achieve higher slit density by migrating to a thinner filter sheet layer thickness.

Figure 12B:
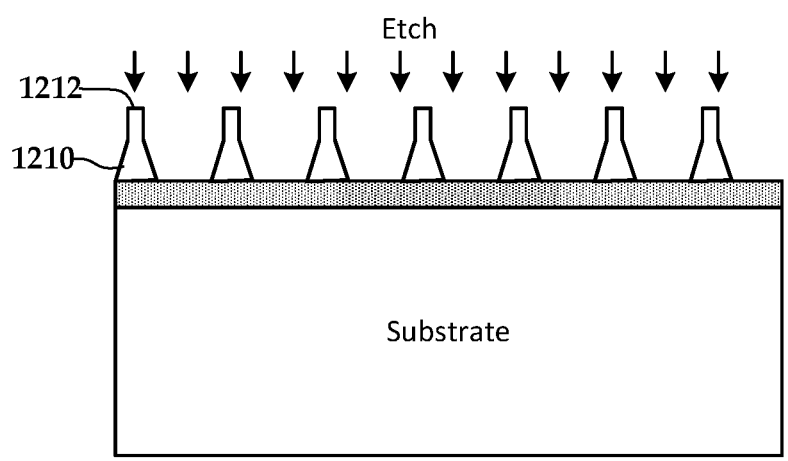
FIG. 12B is a diagram showing a tapered rib structures according to an example embodiment.

The embodiments described herein can break the tradeoff between mechanical requirement and flux efficiency to enable an extremely scalable high density slit filter with robust mechanical properties that can operate at high operating pressure. Referring back to FIGS. 7A and 7B which show the rib patterning process before the flip bonding with the filter chip, another benefit of patterning and etching the rib structure directly from the top side is the ability to shape the rib profile narrow on top and wide on the bottom as show in FIG. 12B. Since the top side 1212 of the rib 1210 will be supporting the filter layer after flip bonding, it may be desirable to minimize the contact support area between the filter layer and rib support 1210 to reduce the flow blockage.

In reference again to FIGS. 1B and 1C, a comparison can be made between a straight rib profile support as in FIG. 1B and a tapered profile as in FIG. 1C. In a straight wall profile, a number of the slits are blocked by the rib support and will reduce the active area of the filter. The arrows in FIG. 1B show inactive slits due to the blockage of the rib supports. With a tapered rib profile shown in FIG. 1C, the top width is narrow compared to the bottom width, the blockage is reduced statistically because of an overall reduction in the contact area, as indicated by the arrows in FIG. 1C, which indicated blocked slits. In some embodiments, the tapered structure can be made with the same or better strength as the straight wall structure, e.g., where the taper angle leaves sufficient support material at the bottom of the rib support.

Figure 13:
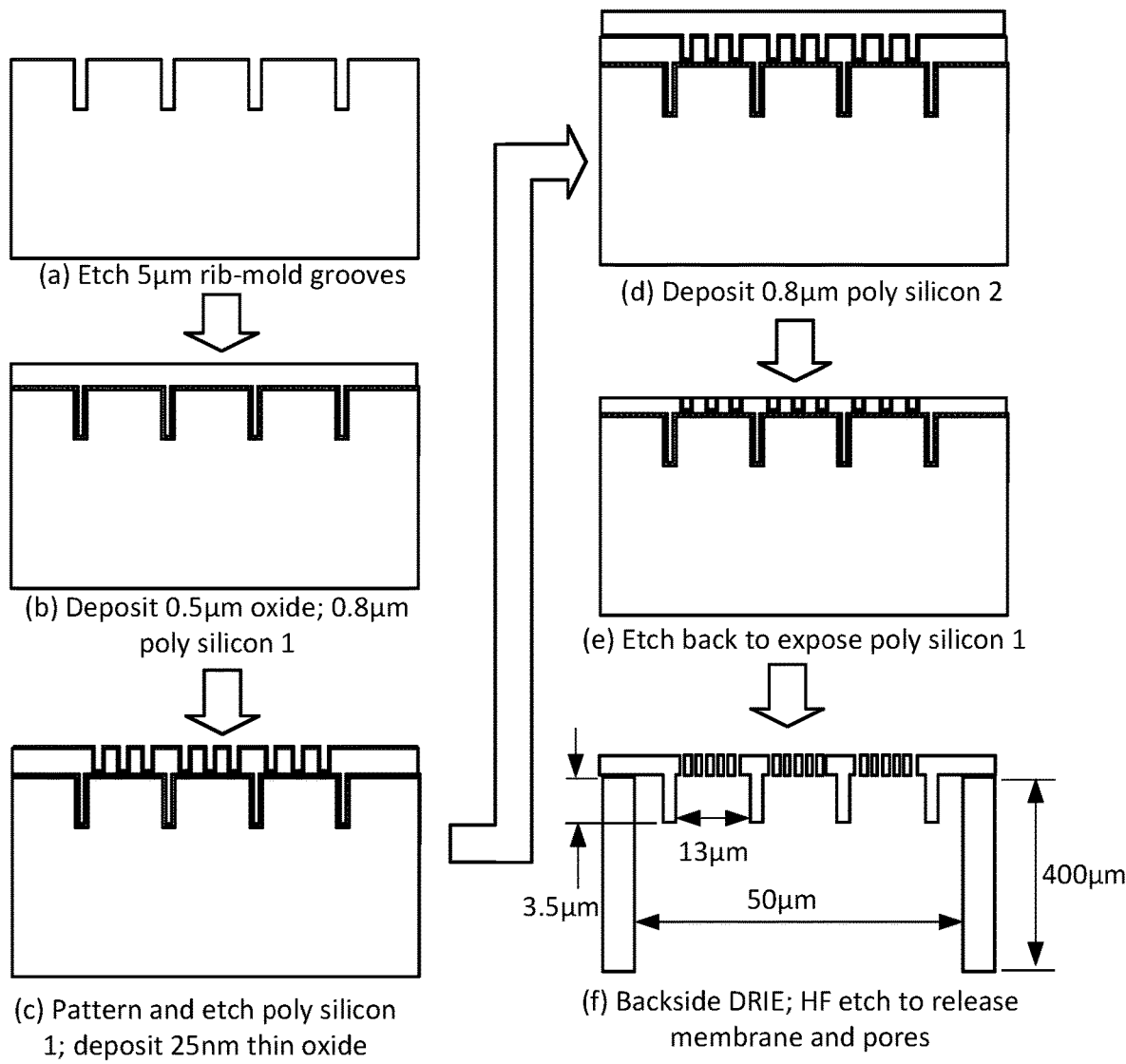
FIG. 13 is a diagram showing an example process for forming the filter structure of FIG. 12A.

Another benefit of the process and structures illustrated above is that no layer-to-layer pattern alignment is needed. To illustrate a counter example, FIG. 13 shows a process to fabricate the filter layer and integrate the rib and support structure as shown in FIG. 12A, but which involves a layer-to-layer alignment. Note that the materials and dimensions shown in FIG. 13 are for purposes of illustration and not limitation. The initial rib pattern is defined in step (a), followed by the poly silicon deposition of the filter sheet layer, and then the pre-slit is patterned is defined. Note that the pre-slit pattern is aligned in the deposition plane (x and y), which consumes additional real estate for alignment tolerances. Secondly, additional process content may be needed to form the layer alignment marks adding to the process complexity. Unlike the process shown in FIG. 13, no alignment is needed in the embodiments described above, e.g., shown in 7A-7B, 8A-8G, and 9-10 between any adjacent layers. Therefore, these embodiments enable full use of the filter region and reduce process complexity related to fabricating all of the substructure from one wafer.

In FIGS. 14A-C, 15A-15C, and 16, diagrams show an assembly process according to another example embodiment. The previous embodiments (see, e.g., FIGS. 7A-8C) involved bonding wafer 700 to wafer 805, wherein wafer 700 has the pre-defined rib structure 708, etch stop layer 704, and substrate 706 that will eventually form the main support. Wafer 805 has the ultra-filter layer pre-defined (without the final gap opening etch) before attachment to the support wafer 704. Note that the substrate 824 and etch stop 820 of wafer 805 will eventually be fully etched away.

Figure 14A:
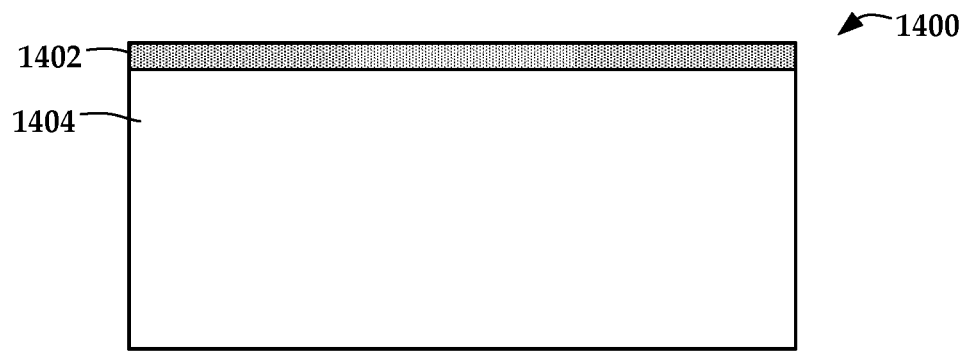
FIGS. 14A-14C are diagrams showing a process of forming a first, base support wafer and second filter-forming wafer according to another example embodiment.
Figure 14B:

In the embodiment seen in FIG. 14A, the pre-main support layer 1400 (analogous to wafer 700 in FIG. 7A) will have an etch stop layer 1402 on top of substrate 1404 that will eventually form the main support. As seen in FIG. 14B, wafer 1405 (analogous to wafer 805 in FIG. 8A) now has a rib structure layer 1406, pre-filter layer 1408, and etch stop layers 1407, 1409 on a sacrificial substrate 1410. This change eliminates one possible issue with the need for very low roughness, planar surfaces that are desirable for flip bonding. The diagram in FIG. 16 illustrates how these issues with planar surfaces on the filter layer may occur.

The diagrams in FIG. 16 show the general steps to form the filter layer. Step 1 shows the stage after conformal atomic layer deposition of the gap material 1601 over filter structure 1600 (e.g., "rails" that surround the filter slits) that results in uniform material coverage. Step 2 includes a thick polysilicon deposition 1602 that fills in the trench and will results in a relatively smooth and planar top surface. Step 3 includes etching the polysilicon 1602 to expose the gap material 1602 and trench region. The gap material 1601 is selected to have low etch rate compared to the polysilicon 1602. However, this will involve an over etch process to ensure that all of the polysilicon material 1602 on top of the plateau is fully removed, possibly resulting in a non-planar profile. Step 4 involves removing the gap material 1601 on top of the plateau in preparation for bonding to the rib structure. The non-planar top surface is evident in this figure. During bonding, only the high points of the gap material 1601 may bond to the ribs while the other low polysilicon rails 1600 may be unattached once the gap material 1601 is dissolved. Note that a similar non-planar bonding surface may result from the slightly different sequence shown in FIGS. 8D-8G and described in greater detail above.

One of the options is to use chemical mechanical planarization (CMP) after step 4 which can be used with the process shown in FIGS. 7A-7B, 8A-8G, and 9-10. However, CMP may require tight tolerances since this filter layer is relatively thin on the order of 100 to 300 nm thick in some embodiments. Alternatively, the embodiment shown in FIGS. 14A-14C and 15A-15C can simplify the process and eliminate the need for CMP as the resulting process while keeping the mating surface planar.

Figure 14C:
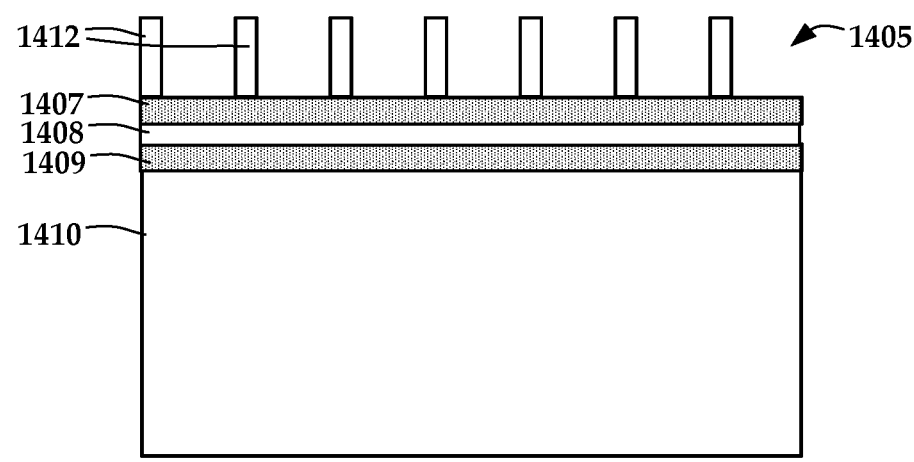

In reference again to FIG. 14B, wafer 1405 will now be prepared to form both the filter layer and rib structure. Etch stop layer 1407 is sandwiched between the pre-rib layer 1406 and pre-filter layer 1408, and a second etch stop layer 11409 is inserted between the pre-filter layer 1408 and sacrificial substrate 1410. As seen in FIG. 14C, the rib structure 1412 is formed in layer 1406 by masking the desired pattern and etching down to the etch stop 1407.

Figure 15A:
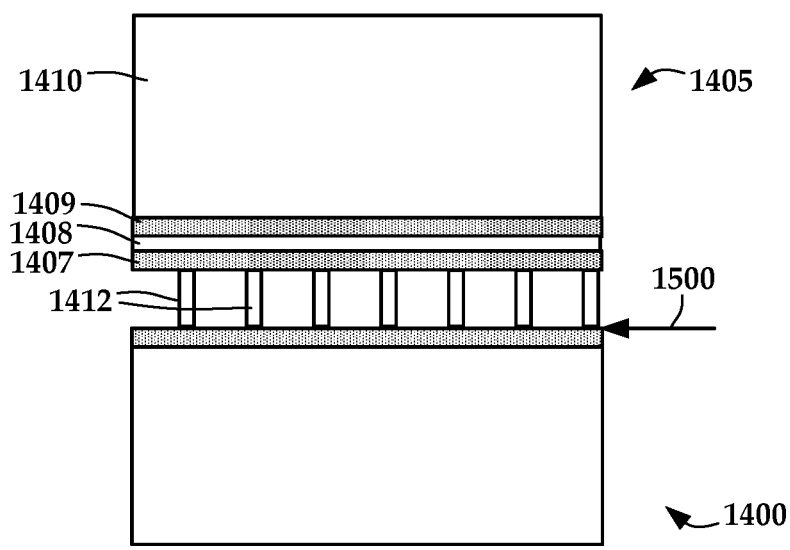
FIGS. 15A-15C are diagrams showing a process of flip bonding and etching the first and second wafers of FIGS. 14A-14C.
Figure 15B:
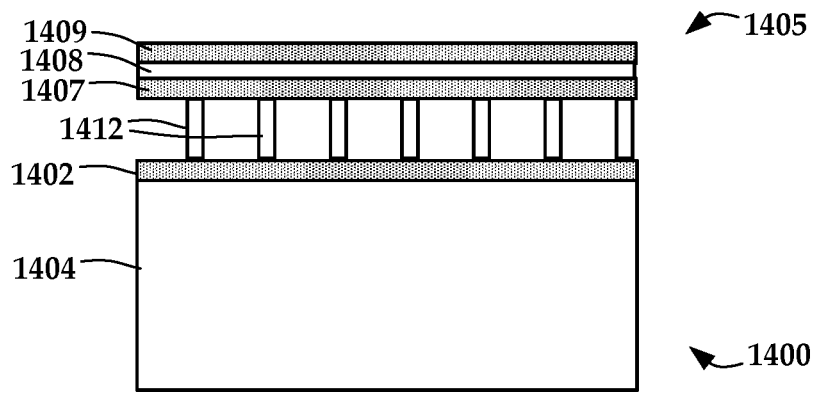
Figure 15C:
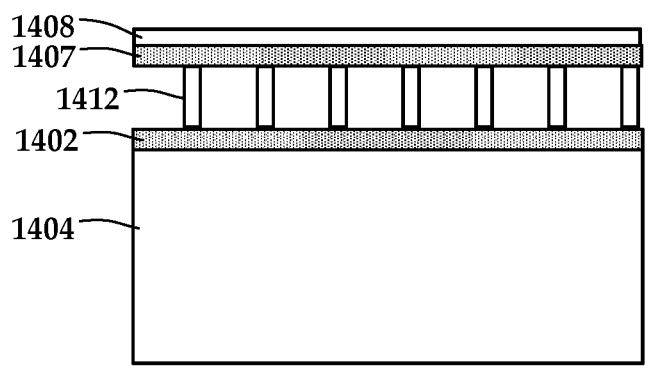

As seen in FIG. 15A, wafer 1405 is flipped and bonded to wafer 1400. Note that either wafer 1400, 1405 may be flipped before bonding. The bonding interface location is indicated by the arrow 1500. The two wafers 1400, 1405 both have planar interface that enables strong wafer-towafer bonding. As seen in FIG. 15B, the sacrificial substrate 1410 of wafer 1405 is removed and the etch stop 1409 is removed as seen in FIG. 15C. The filter structure and main support can be formed once the two wafers have been bonded. For example, the initial filter structure can be formed as shown in FIG. 16 and the main supports and finishing of the filter layer can be performed as shown in FIGS. 8D-8G or FIG. 16.

Figure 17:
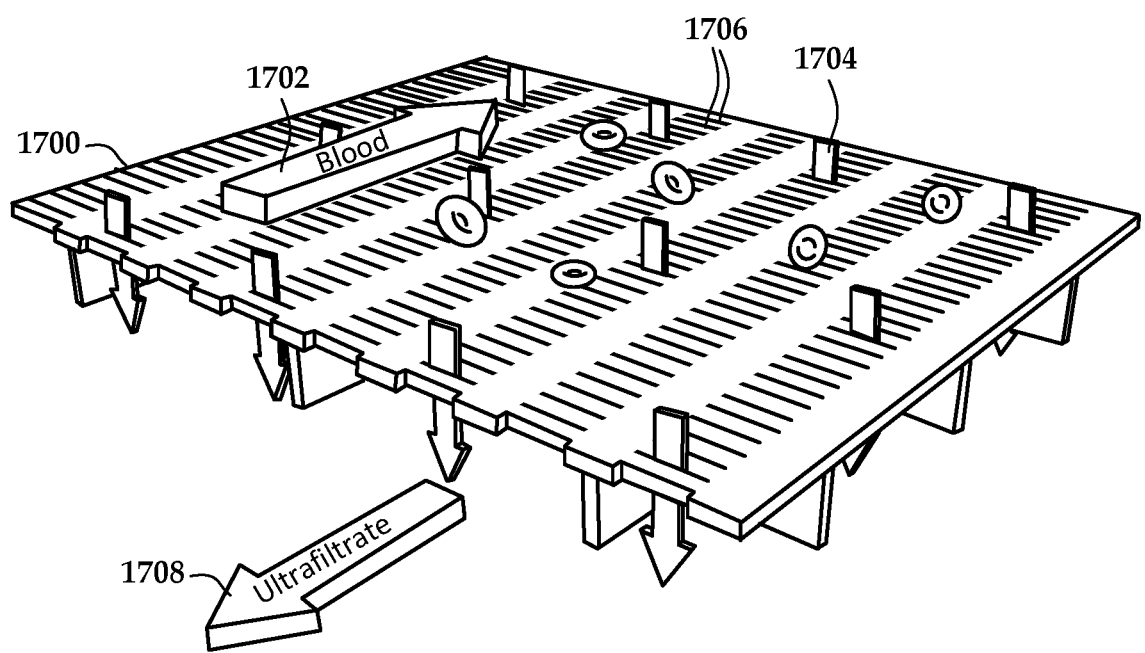
FIG. 17 is a perspective view of a filter being used in a blood filtering application according to an example embodiment.

As seen in FIG. 17, a filter 1700 according to the illustrated embodiments may be used for filtering biological material such as blood. This may be used for purposes such as artificial kidneys. Arrow 1702 indicates blood flowing on one side of the filter 1700. As indicated by arrows 1704, an ultra-filtrate of the blood passes through slits 1706 of the filter 1700 and joins an ultra-filtrate flow 1708 on an opposite side of the filter 1700.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A method of forming a filter, comprising:
    forming a first wafer comprising a first stop layer deposited on a substrate, the substrate used to form a base support structure comprising a first collection of first closed shapes;
    forming a second wafer comprising a second stop layer deposited on a sacrificial substrate, and a filter layer being deposited on the second stop layer;
    depositing a rib layer on one of: the first stop layer of the first wafer; or a third stop layer that is deposited over the filter layer of the second wafer;
    etching a rib pattern in the rib layer, the rib pattern comprising a second collection of second closed shapes;
    flip bonding the first and second wafers such that the rib pattern is joined between the filter layer and the first stop layer;
    forming elongated voids within the filter layer; and
    after the flip bonding of the first and second wafers:
        etching through the substrate of the first wafer to form the base support structure; and
        etching through the first stop layer such that there is a fluid flow path between the base support structure, the rib layer, and the elongated voids of the filter layer.

2. The method of claim 1, wherein the rib layer is deposited on the first stop layer of the first layer, and wherein the elongated voids are formed within the filter layer before joining the first and second wafers.

3. The method of claim 2, further comprising, after forming the elongated voids within the filter layer:
    covering an exposed surface of the filter layer and the elongated voids with a controlled-thickness gap layer material;
    covering the gap layer material with a planarization filling material;
    removing a portion of the gap layer and planarization filling material such that the exposed surface of the filter layer is again exposed and a second portion of the gap layer material and planarization filling material remain in the elongated voids; and
    planarizing the exposed surface of the filter layer; and
    after the flip bonding of the first and second wafers, selective etching to remove the gap material and thereby create open spaces in the filter layer.

4. The method of claim 1, wherein the rib layer is deposited on the third stop layer that is deposited over the filter layer, and wherein the elongated voids are formed within the filter layers after the flip bonding of the first and second wafers.

5. The method of claim 1, wherein the filter layer, the rib layer, and the substrate are formed of silicon.

6. The method of claim 1, wherein the second closed shapes of the rib pattern are each no larger than 0.10 the size by area of the first closed shapes of the base support structure.

7. The method of claim 1, wherein the first closed shapes comprise first rectangles and the second closed shapes comprise second rectangles that are at an angle between 20 and 70 degrees to the first rectangles.

8. The method of claim 1, wherein forming the base support structure comprises deep etching voids that terminate at the first stop layer, the method further comprising:
    performing a reactive ion etch that selectively removes the first stop layer and leaves the filter layer intact; and
    performing a final selective etch that removes a gap material and a planarization fill material from the elongated voids of the filter layer.

9. The method of claim 1, further comprising removing the sacrificial substrate from the second wafer after the flip bonding.

10. A method of forming a filter, comprising:
    forming a first wafer that comprises, in order, a substrate, a first stop layer and a rib layer, the substrate used to form a base support structure comprising a first collection of first closed shapes;

etching a rib pattern in the rib layer, the rib pattern comprising a second collection of second closed shapes;

forming a second wafer comprising a sacrificial substrate, a second stop layer, and a filter layer;

forming elongated voids within the filter layer and filling the elongated voids with a controlled-thickness gap layer material and a planarization filling material;

flip bonding the first and second wafers such that the rib pattern is joined to the filter layer; and after the flip bonding of the first and second wafers:
etching through the substrate of the first wafer to form the base support structure and
etching through the first stop layer such that there is a fluid flow path between the base support structure, the rib layer, and the elongated voids of the filter layer.

11. The method of claim 10, wherein forming the elongated voids within the filter layer comprises:
covering an exposed surface of the filter layer and the elongated voids with the controlled-thickness gap layer material;
covering the gap layer material with the planarization filling material;
removing a first portion of the gap layer and a first portion of the planarization filling material such that the exposed surface of the filter layer is again exposed and a second portion of the gap layer material and a second portion of the planarization filling material remain in the elongated voids; and
planarizing the exposed surface; and
after the flip bonding of the first and second wafers, selective etching to remove the gap material and thereby create open spaces in the filter layer.

12. The method of claim 10, wherein the filter layer, the rib layer, and the substrate are formed of silicon.

13. The method of claim 10, wherein the second closed shapes of the rib pattern are each no larger than 0.10 the size by area of the first closed shapes of the base support structure.

14. The method of claim 10, wherein the first closed shapes comprise first rectangles and the second closed shapes comprise second rectangles that are at an angle between 20 and 70 degrees to the first rectangles.

15. The method of claim 1, wherein forming the base support structure comprises deep etching voids that terminate at the first stop layer, the method further comprising:

performing a reactive ion etch that selectively removes the first stop layer and leaves the filter layer intact; and performing a final selective etch that removes a gap material and a planarization fill material from the elongated voids of the filter layer.

16. A method of forming a filter, comprising:
forming a first wafer comprising a first stop layer deposited on a substrate, the substrate used to form a base support structure comprising a first collection of first closed shapes;

forming a second wafer by forming, in order, on a sacrificial substrate: a second stop layer, a filter layer, a third stop layer, and a rib layer;

etching a rib pattern in the rib layer, the rib pattern comprising a second collection of second closed shapes;

flip bonding the first and second wafers such that the rib pattern is joined to the first stop layer of the first wafer;

forming elongated voids within the filter layer; and after the flip bonding of the first and second wafers:
etching through the substrate to form the base support structure; and
etching through the first stop layer such that there is a fluid flow path between the base support structure, the rib layer, and the elongated voids of the filter layer.

17. The method of claim 16, wherein the filter layer, the rib layer, and the substrate are formed of silicon.

18. The method of claim 16, wherein the second closed shapes of the rib pattern are each no larger than 0.10 the size by area of the first closed shapes of the base support structure.

19. The method of claim 16, wherein the first closed shapes comprise first rectangles and the second closed shapes comprise second rectangles that are at an angle between 20 and 70 degrees to the first rectangles.

20. The method of claim 16, wherein forming the base support structure comprises deep etching voids that terminate at the first stop layer, the method further comprising:
performing a reactive ion etch that selectively removes the first stop layer and leaves the filter layer intact; and performing a final selective etch that removes a gap material and a planarization fill material from the elongated voids of the filter layer.

* * * * *